(12) United States Patent
Liu

(10) Patent No.: US 9,918,498 B2
(45) Date of Patent: Mar. 20, 2018

(54) ELECTRONIC CIGARETTE

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen, Guangdong (CN)

( * ) Notice: Subject to any disclaimer, the term of this patent is extended or adjusted under 35 U.S.C. 154(b) by 0 days.

(21) Appl. No.: 15/234,834

(22) Filed: Aug. 11, 2016

(65) Prior Publication Data

US 2016/0345636 A1    Dec. 1, 2016

Related U.S. Application Data

(63) Continuation of application No. PCT/CN2014/074375, filed on Mar. 31, 2014.

(51) Int. Cl.
*A24F 47/00* (2006.01)
*H05B 3/03* (2006.01)
*F16J 15/02* (2006.01)

(52) U.S. Cl.
CPC ........... *A24F 47/008* (2013.01); *F16J 15/022* (2013.01); *H05B 3/03* (2013.01); *H05B 2203/021* (2013.01)

(58) Field of Classification Search
CPC ... A24F 47/002; A24F 47/008; A61M 11/005; B05B 17/06
See application file for complete search history.

(56) References Cited

U.S. PATENT DOCUMENTS

| | | | |
|---|---|---|---|
| 9,132,248 B2* | 9/2015 | Qiu | A61M 11/041 |
| 2011/0277780 A1 | 11/2011 | Terry et al. | |
| 2015/0305407 A1* | 10/2015 | Li | A24F 47/008 |
| | | | 131/273 |
| 2016/0366936 A1* | 12/2016 | Liu | A24F 47/008 |

FOREIGN PATENT DOCUMENTS

| | | |
|---|---|---|
| CN | 202664230 U | 1/2013 |
| CN | 103271448 A | 9/2013 |
| CN | 203327954 U | 12/2013 |
| CN | 203399711 U | 1/2014 |
| CN | 203416808 U | 2/2014 |

* cited by examiner

*Primary Examiner* — Xuong Chung Trans
(74) *Attorney, Agent, or Firm* — U.S. Fairsky LLP; Yue Xu

(57) ABSTRACT

An electronic cigarette is provided. The electronic cigarette includes: an electronic cigarette body. The electronic cigarette body is provided with a smoking end, a cigarette liquid container, an atomizing assembly and a battery rod assembly. The atomizing assembly includes a liquid guiding mechanism and an atomizing core. The atomizing core is provided with a first limiting part and a second limiting part, a first clamping part and a second clamping part are arranged at two positions on the electronic cigarette body corresponding to the first limiting part and the second liming part on the atomizing core, respectively.

18 Claims, 4 Drawing Sheets

ELECTRONIC CIGARETTE

CROSS REFERENCE OF RELATED APPLICATIONS

This application is a continuation of International Application No. PCT/CN2014/074375, titled "ELECTRONIC CIGARETTE", and filed on Mar. 31, 2014, which is hereby incorporated by reference in its entirety.

TECHNICAL FIELD

The present application relates to the field of electronic cigarette, and in particular to an electronic cigarette with an atomizing assembly which is convenient to be cleaned or cleared.

BACKGROUND

An electronic cigarette is a new electronic product, which has the same appearance and similar flavor as the cigarette. However, compared with the conventional cigarette, the electronic cigarette is more healthy and environmental. The electronic cigarette atomizes cigarette liquid containing nicotine and essence into particle by an atomizing core to output. The electronic cigarette does not contain harmful ingredients in the cigarette, such as tar, suspended particles, and etc., and does not generate diffused or smoky second-hand smoke.

In the conventional technology, the electronic cigarette includes a suction nozzle, an atomizing assembly and a battery rod assembly which are connected and fixed to each other end to end in order and are fixed in the electronic cigarette. A microcontroller and an air flow sensor are provided on the battery rod assembly. In the case that the air flow sensor senses that a user is smoking, the microcontroller controls a heating wire assembly of the atomizing assembly to atomize the cigarette liquid in the atomizing assembly. However, the atomizing assembly in the electronic cigarette is relatively easy to be damaged. Since individual components in the electronic cigarette are connected and fixed to each other, if the atomizing assembly is damaged, the whole electronic cigarette needs to be replaced.

SUMMARY

According to the embodiments of the present application, it is provided an electronic cigarette with an atomizing assembly which is convenient to be cleaned or cleared.

An electronic cigarette is provided, which includes:
an electronic cigarette body;
where the electronic cigarette body is provided with a smoking end, a cigarette liquid container for containing cigarette liquid, an atomizing assembly for atomizing the cigarette liquid, and a battery rod assembly for supplying power for the atomizing assembly, wherein the cigarette liquid container is detachably arranged at an end of the atomizing assembly that faces away from the smoking end;
the atomizing assembly includes a liquid guiding mechanism, and an atomizing core for atomizing the cigarette liquid, where the liquid guiding mechanism pricks the cigarette liquid container for conveying the cigarette liquid in the cigarette liquid container to the atomizing core for atomizing;
where the atomizing core is provided with a first limiting part and a second limiting part, and a first clamping part and a second clamping part are arranged at two positions on the electronic cigarette body that are corresponding to the first limiting part and the second limiting part on the atomizing core, respectively; the atomizing assembly is detachably arranged on the electronic cigarette body by cooperation between the first limiting part and the first clamping part and cooperation between the second limiting part and the second clamping part;
where the first limiting part is one of a concave part and an elastic convex part, the first clamping part is the other of the concave part and the elastic convex part; the second limiting part is one of a concave part and the an elastic convex part, the second clamping part is the other of the concave part and the elastic convex part.

In the electronic cigarette according to the present application, the atomizing core includes a first electrode and a second electrode, the first limiting part is a part of the first electrode, the second limiting part is a part of the second electrode;
one end of the battery rod assembly is provided with a third electrode and a fourth electrode;
the electronic cigarette body is provided with a frame, on which a first connecting device for connecting the first clamping part and the third electrode, and a second connecting device for connecting the second clamping part and the fourth electrode are arranged.

In the electronic cigarette according to the present application, the first limiting part and the second limiting part are a first concave part and a second concave part, respectively; the first clamping part and the second clamping part are a first elastic convex part and a second elastic convex part, respectively;
a first fixing hole is provided at a position on the frame that is corresponding to an opening of the first concave part, and a second fixing hole is provided at a position on the frame that is corresponding to an opening of the second concave part;
the first elastic convex part includes a first spring and a first elastic stub which are connected to each other, an end of the first spring that faces away from the first elastic stub is fixed at a bottom of the first fixing hole, the first elastic stub goes beyond the first fixing hole and is movably inserted into the first concave part;
the second elastic convex part includes a second spring and a second elastic stub which are connected to each other, an end of the second spring that faces away from the second elastic stub is fixed at a bottom of the second fixing hole, the second elastic stub goes beyond the second fixing hole and is movably inserted into the second concave part.

In the electronic cigarette according to the present application, the first limiting part and the second limiting part are a first concave part and a second concave part, respectively; and the first clamping part and the second clamping part are a first elastic convex part and a second elastic convex part, respectively;
the frame is provided with a first elastic piece and a second elastic piece along two sides of the atomizing core respectively, a portion of the first elastic piece that is corresponding to the first concave part is provided with the first elastic convex part which is movably fixed on the first concave part with a snapping manner;
a part of the second elastic piece that is corresponding to the second concave part is provided with the second elastic convex part which is movably fixed on the second concave part with the snapping manner.

In the electronic cigarette according to the present application, the first connecting device further includes a first elastic needle electrode electrically connected to the first elastic convex part, the second connecting device further includes a second elastic needle electrode electrically connected to the second elastic convex part;

the frame is provided with a cavity for containing the battery rod assembly, the battery rod assembly is located in the cavity, and the third electrode is electrically connected to the first elastic needle electrode detachably, the fourth electrode is electrically connected to the second elastic needle electrode detachably.

In the electronic cigarette according to the present application, an end of the cavity that is corresponding to the battery rod assembly is provided with an opening, a cover is arranged on the opening with detachable connection.

In the electronic cigarette according to the present application, the atomizing assembly and the cigarette liquid container are arranged in parallel with the battery rod assembly, the end of the atomizing assembly on which the first electrode and the second electrode are arranged is adjacent to the end of the battery rod assembly on which the third electrode and the fourth electrode are arranged; the end of the atomizing assembly which faces away from the first electrode and the second electrode is adjacent to an end of the battery rod assembly which faces away from the third electrode and the fourth electrode.

In the electronic cigarette according to the present application, the electronic cigarette body is provided with an air inlet and a smoke channel for connecting the smoking end and the air inlet, wherein the smoke channel is arranged on a side of the cigarette liquid container that faces to the atomizing core.

In the electronic cigarette according to the present application, the electronic cigarette body is provided with a first thread segment;

an opening end of the cigarette liquid container is provided with a first mating thread for coupling with the first thread segment;

the cigarette liquid container is detachably connected to the electronic cigarette body by cooperation between the first mating thread and the first thread segment.

In the electronic cigarette according to the present application, the electronic cigarette body is provided with a third elastic convex part;

an opening end of the cigarette liquid container is provided with a third concave part that is corresponding to the third elastic convex part;

the cigarette liquid container is detachably connected to the electronic cigarette body by cooperation between the third concave part and the third elastic convex part.

In the electronic cigarette according to the present application, a sealing ring with a through hole is arranged at an opening of the cigarette liquid container, the liquid guiding mechanism pricks the cigarette liquid container through the through hole of the sealing ring, the cigarette liquid container is sealed by the sealing ring and the liquid guiding mechanism.

In the electronic cigarette according to the present application, a thin film which can be pierced is arranged inside the through hole of the sealing ring, for sealing the cigarette liquid container.

In the electronic cigarette according to the present application, the atomizing core is provided with a first limiting part and a second limiting part at the two sides of the atomizing core respectively, and a first clamping part and a second clamping part are provided on the electronic cigarette that are corresponding to the first limiting part and the second limiting part, respectively, where the first limiting part is one of a concave part and an elastic convex part, the first clamping part is the other of the concave part and the elastic convex part; the second limiting part is one of a concave part and an elastic convex part, the second clamping part is the other of the concave part and the elastic convex part. Hence, the atomizing assembly is detachably arranged on the electronic cigarette body by elastic clamping cooperation between the first limiting part and the first clamping part and elastic clamping cooperation between the second limiting part and the second clamping part. Therefore, it is convenient to displace or clean the atomizing assembly due to the simple structure.

DETAILED DESCRIPTION

According to the present application, it is disclosed an electronic cigarette, in which an atomizing assembly and an electronic cigarette body can be detachably fixed to each other, facilitating change or cleaning of the atomizing assembly.

The technical solutions in the embodiments of the present application will be described clearly and completely hereinafter in conjunction with the drawings in the embodiments of the present application. Apparently, the described embodiments are only a few of the embodiments of the present application, rather than all embodiments. Based on the embodiments in the present application, all of other embodiments, made by the person skilled in the art without any creative efforts, fall into the protection scope of the present application.

Figure 1:
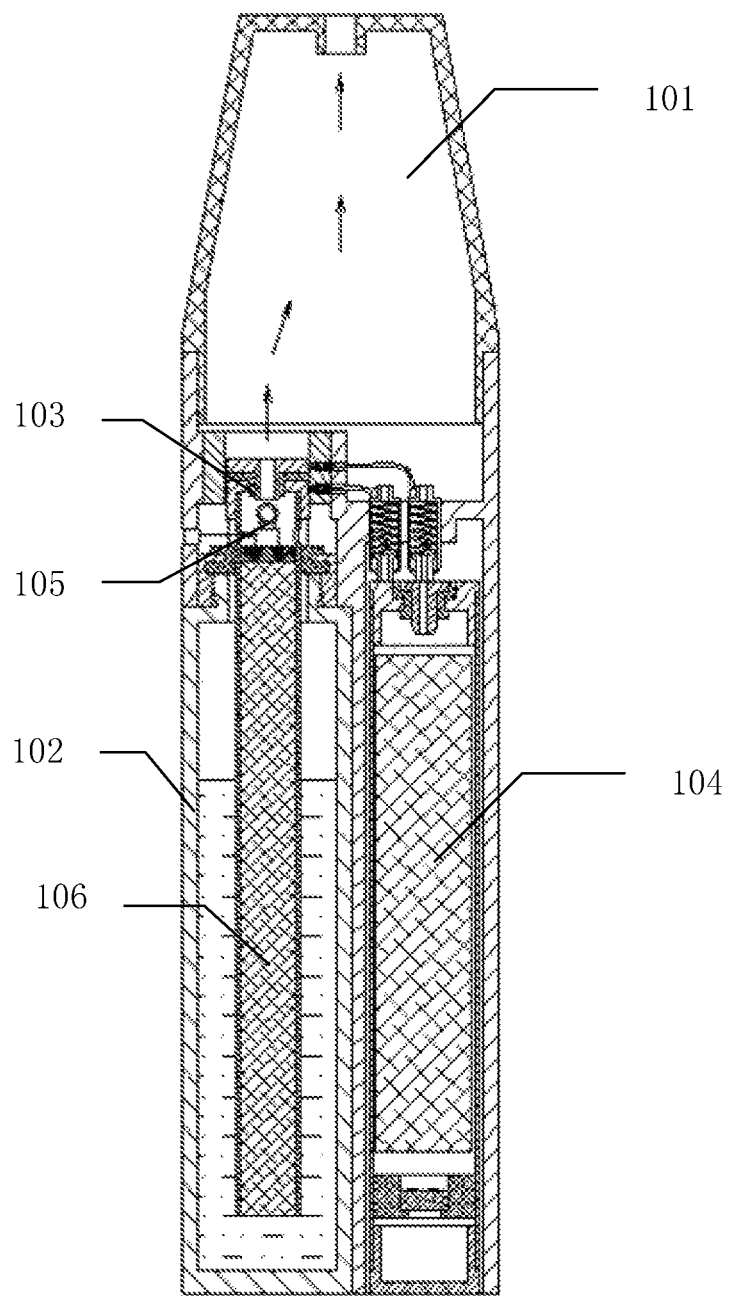
FIG. 1 is a sectional schematic structural diagram of an electronic cigarette according to an embodiment of the present application.

Referring to FIG. 1, an electronic cigarette according to an embodiment of the present application includes:

an electronic cigarette body; an end of the electronic cigarette body is provided with a smoking end 101, via which a user smokes. The electronic cigarette body is provided with a cigarette liquid container 102 for containing cigarette liquid, an atomizing assembly 103, and a battery assembly 104 for supplying power for the atomizing assembly 103.

The atomizing assembly 103 includes an atomizing core 105 for atomizing the cigarette liquid and a liquid guiding mechanism 106. The cigarette liquid container 102 is adjacent to the liquid guiding mechanism 106, and the liquid guiding mechanism 106 pricks the cigarette liquid container 102 for conveying the cigarette liquid in the cigarette liquid container 102 for atomizing. The atomizing core 105 is connected to the liquid guiding mechanism 106 and is located at a side of the liquid guiding mechanism 106 that faces away from the cigarette liquid container 102. The atomizing core 105 is adjacent to the smoking end 101, the cigarette liquid container 102 is detachably arranged at an end of the atomizing assembly 103 that faces away from the smoking end 101.

Figure 2:
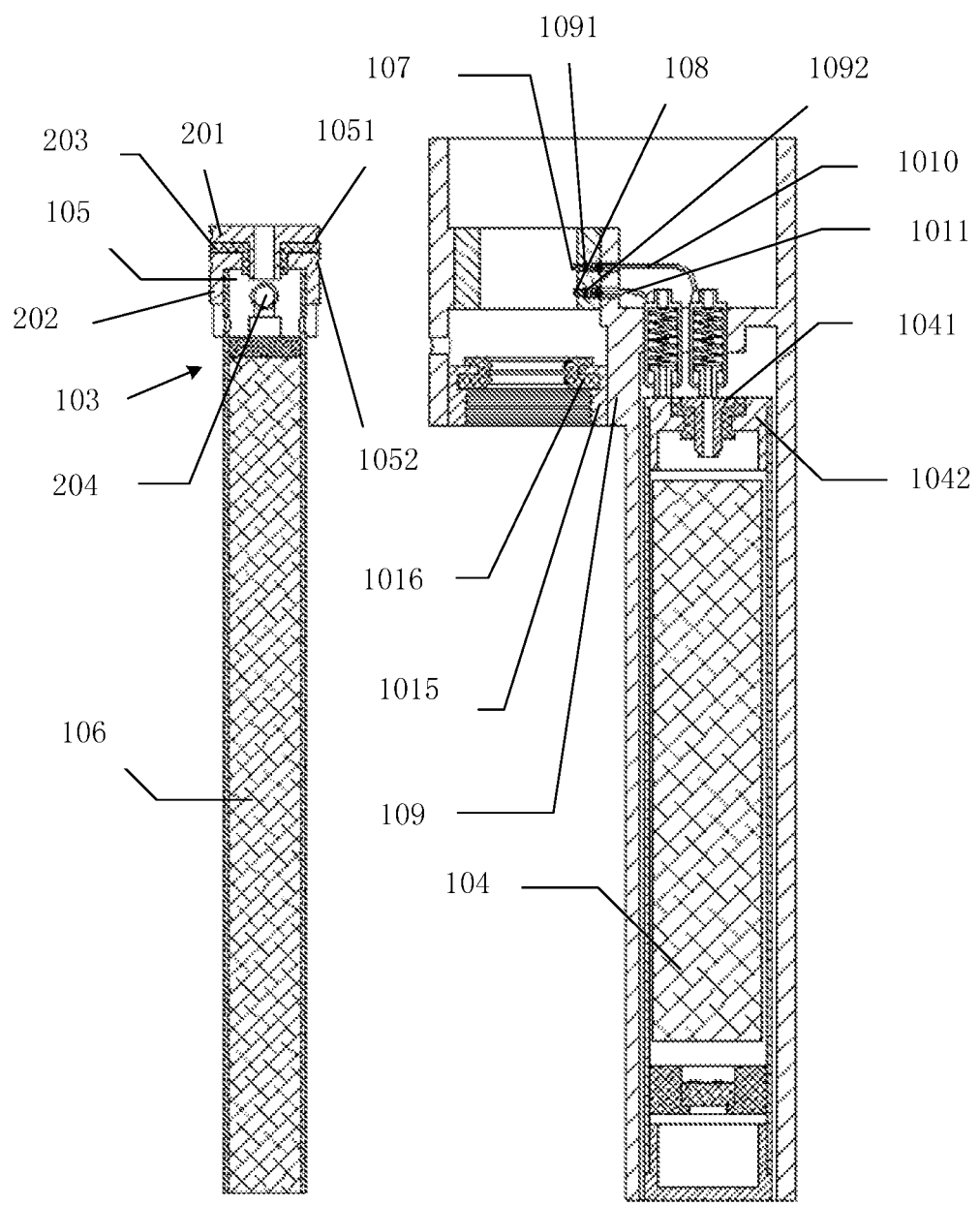
FIG. 2 on the right is a sectional schematic structural diagram of a frame and a battery rod assembly in the electronic cigarette shown in FIG. 1, FIG. 2 on the left is a sectional structure schematic diagram of an atomizing assembly in the electronic cigarette shown in FIG. 1.

Referring to FIG. 2, FIG. 2 on the right is a sectional schematic structural diagram of a frame and a battery rod assembly in the electronic cigarette shown in FIG. 1, FIG. 2 on the left is a sectional structural schematic diagram of an atomizing assembly in the electronic cigarette shown in FIG. 1.

The atomizing core 105 is provided with a first limiting part 1051 and a second limiting part 1052. In the present application, the first limiting part 1051 and the second limiting part 1052 are both located on the same side of the atomizing core 105. In a practical application, these two limiting parts may not located on the same side of the atomizing core, but may located at two sides of the atomizing core, respectively. Correspondingly, a first clamping part 107 and a second clamping part 108 are arranged at two positions on the electronic cigarette body that are corresponding to the first limiting part 1051 and the second limiting part 1052 on the atomizing core 105, respectively. The atomizing assembly 106 is detachably arranged on the electronic cigarette body by the cooperating between the first limiting part 1051 and the first clamping part 107, and the cooperating between the second limiting part 1052 and the second clamping part 108.

In the present embodiment, the first limiting part 1051 may be one of a concave part and an elastic convex part; correspondingly, the first clamping part 107 may be the other of the concave part and the elastic convex part; the second limiting part 1052 may be one of a concave part and the an elastic convex part, the second clamping part 108 may be the other of the concave part and the elastic convex part.

In the present embodiment, the atomizing assembly is detachably arranged on the electronic cigarette body by the elastic clamping cooperation between the first limiting part and the first clamping part, and the elastic clamping cooperation between the second limiting part and the second clamping part. Thus the atomizing assembly and the electronic cigarette body are detachably fixed to each other, and it is convenient to change or clean the atomizing assembly due to the simple installation. Further, with the connection structure which is achieved by elastic clamping cooperation, the situation that after being assembled and disassembled for several times, the atomizing core becomes loose, which makes the connection unreliable is avoided. The atomizing core is adjacent to the smoking end and the cigarette liquid container is located at the side of the atomizing core that faces away from the smoking end, the smoke atomized by the atomizing core may directly go into the smoking end, thus greatly reducing the travel distance of the smoke in the electronic cigarette. Further, the smoke directly goes into the smoking end and is sucked away without passing through the cigarette liquid container. Hence, it is avoided to cause condensation, and thus the situations that smoke channel is blocked by the cigarette liquid and the cigarette liquid is sucked by a user are avoided, and a lot of smoke can be sucked by the user.

In the present embodiment, the atomizing assembly 103 and the cigarette liquid container 102 are both arranged to be parallel to the battery rod assembly. Specifically, the electronic cigarette body is provided with a frame 109 which is fixed to an end of the smoking end 101 with each other. The atomizing assembly 103 and the battery rod assembly 104 are fixed in the frame 109 in parallel. The end of the atomizing assembly 103 at which the atomizing core 105 is located and one end of the battery rod assembly 104 are both adjacent to one end of the smoking end 101. Since the liquid guiding mechanism 106 in the atomizing assembly 103 pricks the cigarette liquid container 102, the cigarette liquid container 102 and the battery rod assembly 104 are arranged in parallel with each other.

In a practical application, there may be no frame 109 on the electronic cigarette body. Instead, the atomizing assembly 103 and the battery rod assembly 104 are fixed to each other by being fixed on the same end of the smoking end 101. Further, the atomizing assembly 103 and the cigarette liquid container 102 may not arranged in parallel with the battery rod assembly 104. The smoking end 101, the atomizing assembly 103, the cigarette liquid container 102, and the battery rod assembly 104 are arranged on the electronic cigarette body to be end to end in order. Alternatively, the smoking end 101, the battery rod assembly 104, the atomizing assembly 103 and the cigarette liquid container 102 are arranged on the electronic cigarette body to be end to end in order, as long as the cigarette liquid container 102 is arranged on the end of the atomizing assembly 103 that faces away from the smoking end 101. Of causes, the description above is only used to illustrate by way of example, but is not limited herein.

In the present application, the atomizing assembly 103 in the electronic cigarette body may be achieved in various structures. One of specific structures of the atomizing assembly of the electronic cigarette will be described in detail in conjunction with FIGS. 1 and 2.

The atomizing core 105 includes a first electrode 201 and a second electrode 202. One end of the battery rod assembly 104 is provided with a third electrode 1041 and a fourth electrode 1042. By electrical connection between the first electrode 201 and the third electrode 1041, and electrical connection between the second electrode 1042 and the fourth electrode 1042, the battery rod assembly 104 may supply power for the atomizing assembly 103.

In the embodiment, the first limiting part 1051 is a part of the first electrode 201, the second limiting part 1052 is a part of the second electrode 202. Specifically, the first limiting part 1051 is a concave part on the first electrode 201 (referred as to first concave part), the second limiting part 1052 is a concave part on the second electrode 202 (referred as to second concave part).

Correspondingly, the first clamping part 107 and the second clamping part 108 are a first elastic convex part 107 and a second elastic convex part 108, respectively. In the present embodiment, the first elastic convex part 107 and the second elastic convex part 108 are arranged at positions on the frame 109 that are corresponding to the first limiting part 1051 (that is an opening of the first concave part) and the second limiting part 1052 (that is an opening of the second concave part), respectively.

Specifically, the frame 109 is provided with a first fixing hole 1091 at a position that is corresponding to the opening of the first concave part 1051, and a second fixing hole 1092 at a position that is corresponding to the opening of the second concave part 1052. The first elastic convex part 107 includes a first spring and a first elastic stub which are connected to each other. An end of the first spring that faces away from the first stub is fixed at the bottom the first fixing hole 1091, and the first elastic stub at least partially goes beyond the first fixing hole 1091 and is movably inserted into the first concave part 1052. Similarly, the second elastic convex part 108 includes a second spring and a second elastic stub which are connected to each other. An end of the second spring that faces away from the second stub is fixed at the bottom the second fixing hole 1092, and the second elastic stub at least partially goes beyond the second fixing hole 1092 and is movably inserted into the second concave part 1052.

The frame 109 is provided with a first connecting device 1010 for connecting the first clamping part and the third electrode, and a second connecting device 1011 for connecting the second clamping part and the fourth electrode. In the present embodiment, the first connecting device 1010 includes wires, and the second connecting device 1011 includes wires. In this way, the first concave part 1051 on the first electrode 201 is electrically connected to the third electrode 1041 via the first spring, the first elastic stub and the first connecting device 1010 in order; the second concave part 1052 on the second electrode 201 is electrically connected to the fourth electrode 1042 via the second spring, the second elastic stub and the second connecting device 1011 in order.

In the embodiment, by arranging the concave parts on the two electrodes of the atomizing core respectively and arranging the two elastic convex parts on the frame, the atomizing core is detachably fixed on the frame. Additionally, the two electrodes of the atomizing core are electrically connected to the two elastic convex parts on the frame, thus the two electrodes on the atomizing core being electrically connected to the two electrodes on the battery rod assembly respectively and the atomizing core being detachably fixed on the frame may be achieved by connecting the two electrodes on the battery rod assembly to the two elastic convex parts via wires. The above assembly is easy to be manufactured due to the simple structure. Moreover, the connecting structure which is achieved by the elastic clamping cooperation may make the electrical connection more reliable, and the situation that after being assembled and disassembled for several times, the atomizing core becomes loose, which makes the electrical connection unreliable is avoided.

In the present embodiment, since the battery rod assembly 104 and the atomizing assembly 103 are arranged in parallel, it is preferable that the end of the battery rod assembly 104 on which the third electrode and the fourth electrode are arranged faces to the smoking end 101. That is the end of the battery rod assembly 104 on which the third electrode and the fourth electrode are arranged is adjacent to the end of the atomizing assembly 103 on which the first electrode and the second electrode are arranged, and the end of the atomizing assembly 103 that faces away from the first electrode and the second electrode is adjacent to the end of the battery rod assembly 104 that faces away from the third electrode and the fourth electrode. In this way, the length of the first connecting device 1010 and the length of the second connecting device 1011 are greatly reduced, saving the cost and making the structure more compact.

Figure 3:
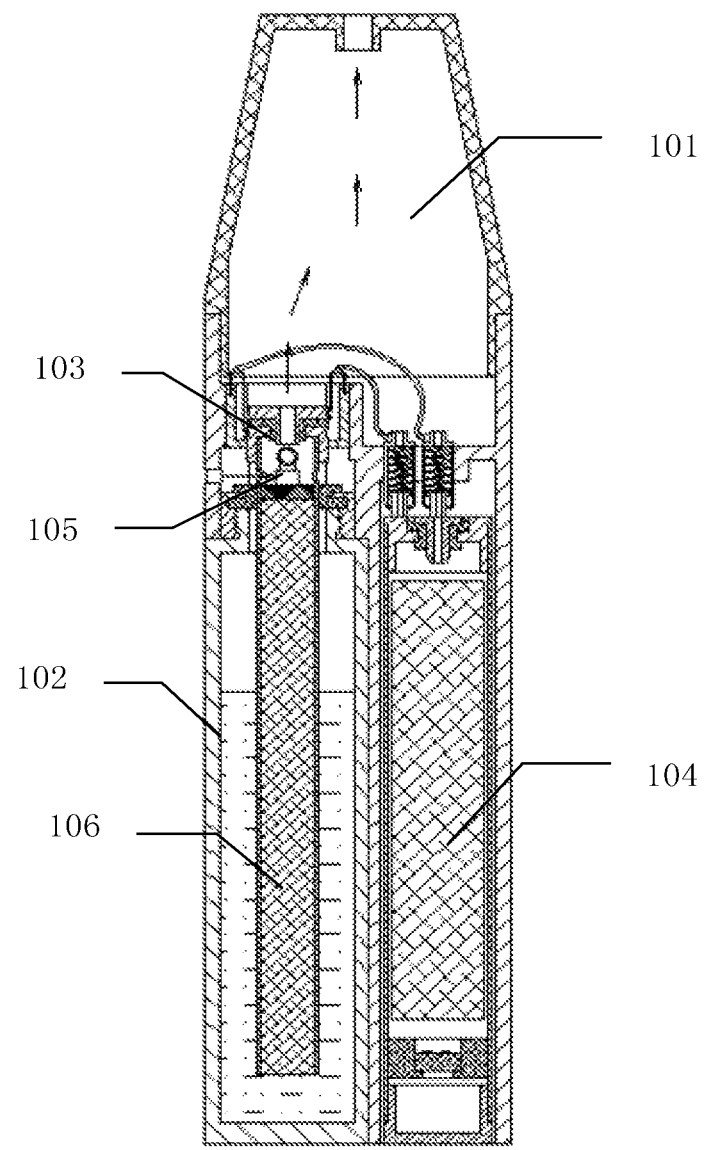
FIG. 3 is a sectional schematic structural diagram of an electronic cigarette according to another embodiment of the present application.
Figure 4:
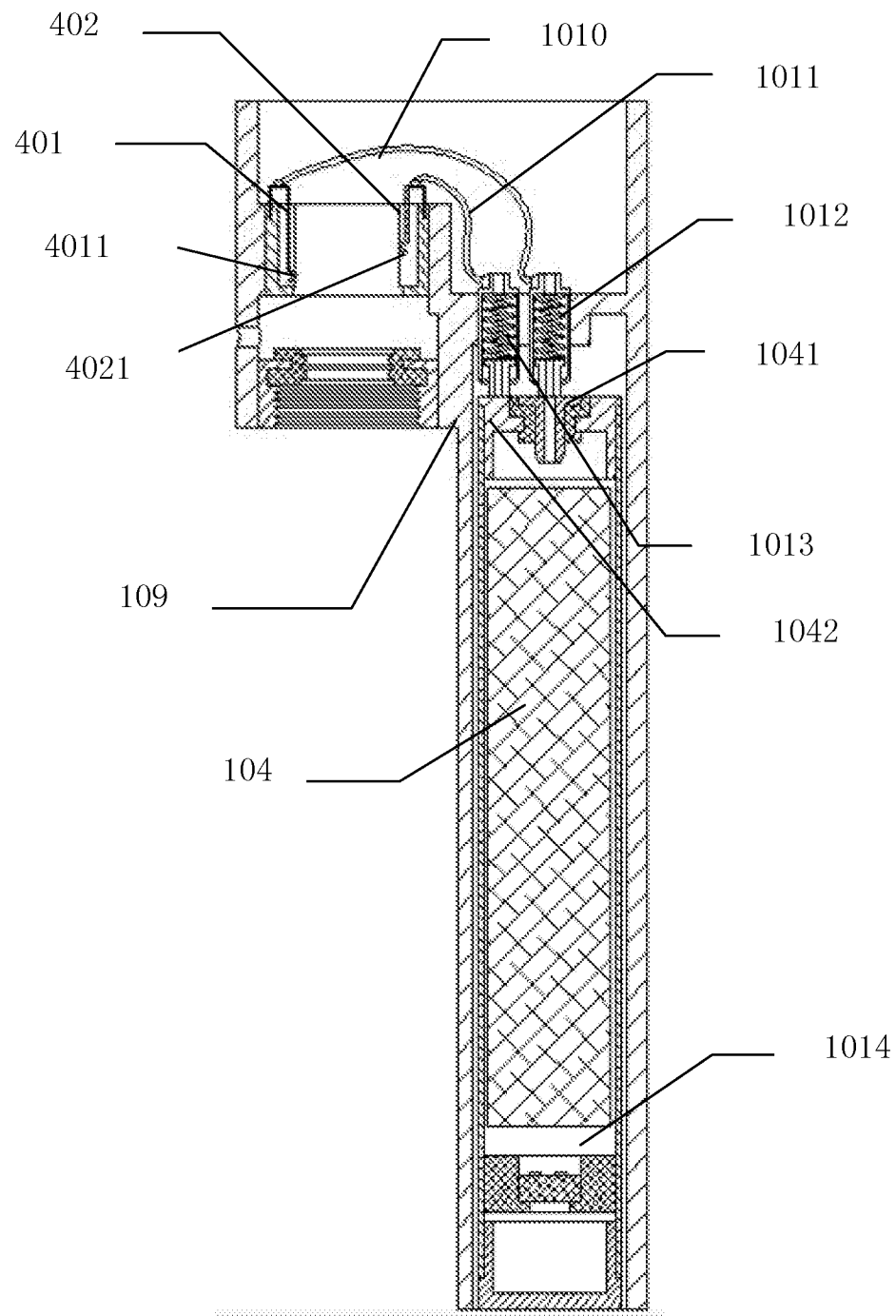
FIG. 4 is a sectional schematic structural diagram of a frame and a battery rod assembly in the electronic cigarette shown in FIG. 3.

The a practical application, the elastic convex part and the second elastic convex part may not the spring and the elastic stub which are connected to each other as descried in the above embodiment, but may have other structure. Referring to FIGS. 3 and 4, FIG. 3 is a sectional schematic structural diagram of an electronic cigarette according to another embodiment of the present application, and FIG. 4 is a sectional schematic structural diagram of a frame and a battery rod assembly in the electronic cigarette shown in FIG. 3.

In the present embodiment, an atomizing assembly 103, a smoking end 101 and an cigarette liquid container 102 are the same as the atomizing assembly 103, the smoking end 101 and the cigarette liquid container 102 of the electronic cigarette shown in FIG. 1. The differences from the electronic cigarette shown in FIG. 1 is that in the present embodiment, the first elastic convex part and the second elastic convex part arranged on the frame are not the spring and the elastic stub which are connected to each other, but are elastic pieces. Correspondingly, in the present embodiment, there is no fixing hole fixing the spring and the elastic stub provided on the frame.

Referring to FIGS. 3 and 4, in the present embodiment, the atomizing core 105 is fixed inside the frame 109. A first elastic piece 401 and a second elastic piece 402 are arranged on the frame 109 along two sides of the atomizing core 105, respectively. Specifically, the first elastic piece 401 and the second elastic piece 402 are arranged on the two sides of the atomizing core. Correspondingly, the first concave part and the second concave part on the atomizing core are also arranged on the two sides of the atomizing core. An end of the first elastic piece 401 and an end of the second elastic piece 402 are both fixed on the frame 109. A portion of the first elastic piece 401 that is corresponding to the first concave part on the first electrode of the atomizing core 105 is provided with a protrusion 4011. The protrusion 4011 is the first elastic convex part 4011 which is movably fixed in the first concave part by snap-fit. A portion of the second elastic piece 402 that is corresponding to the second concave part on the second electrode of the atomizing core 105 is provided with a protrusion 4021. The protrusion 4021 is the second elastic convex part 4021 which is movably fixed in the second concave part by snap-fit.

Similarly, two ends of the first connecting device 1010 are electrically connected to the first elastic piece 401 and the third electrode 1041, respectively, and two ends of the second connecting device 1011 are electrically connected to the second elastic piece 402 and the fourth electrode 1042, respectively, so that the two electrodes on the atomizing core are electrically connected to the two electrodes on the battery rod assembly, respectively.

In the present embodiment, by arranging the concave parts on the two electrodes of the atomizing core respectively and arranging the two convex parts on the two elastic pieces arranged on the frame, the atomizing assembly is detachably fixed on the electronic cigarette body. And thus the structure is simple and facilitates the user to disassemble the components. Moreover, the two electrodes of the atomizing core are electrically connected to the two elastic convex parts on the frame, thus the two electrodes on the atomizing core being electrically connected to the two electrodes on the battery rod assembly respectively and the atomizing core being detachably fixed on the frame may be achieved by electrically connecting the two electrodes on the battery rod assembly to the two elastic convex parts via wires. The above assembly is easy to be manufactured due to the simple structure.

In the above embodiment, the first limiting part and the second limiting part are both the concave part, and the first clamping part and the second clamping part are both the elastic convex parts. In the practical application, the first limiting part and the second limiting part may be provided to be the elastic convex parts, and correspondingly, the first clamping part and the second clamping part may be provided to be concave parts. For instance, the first limiting part and the second limiting part arranged on the atomizing core are both the spring and the elastic stub which are connected to each other, and the first clamping part and the second clamping part are both the concave parts. Of course, the above is described by way of example, and is not limited herein. Indeed, the first limiting part may be a concave part, and the second limiting part may be an elastic convex part;

correspondingly, the first clamping part may be an elastic convex part, and the second limiting part may be a concave part. Alternatively, the first limiting part may be an elastic convex part, and the second limiting part may be a concave part; correspondingly, the first clamping part may be a concave part, and the second limiting part may be an elastic convex part.

In the above embodiment, the first connecting device and the second connecting device each include wire, and the wire is fixedly connected to the third electrode and the fourth electrode on the battery rod assembly respectively. Referring to FIG. 4, the first connecting device 1010 preferably further includes a first elastic needle electrode 1012, the second connecting device preferably further includes a second elastic needle electrode 1013. Two ends of the wire in the first connecting device 1010 are respectively connected to the first elastic needle electrode 1012 and the first clamping part, and two ends of the wire in the second connecting device 1011 are respectively connected to the second elastic needle electrode 1013 and the second clamping part.

The frame 109 is further provided with a cavity 1014 for containing the battery rod assembly 104. The battery rod assembly 104 is located inside the cavity 1014, the third electrode 1041 is electrically connected to the first elastic needle electrode 1012 detachably, and the fourth electrode 1042 is electrically connected to the second elastic needle electrode 1013 detachably. In this way, it is achieved that the battery rod assembly 104 is detachably connected to the elastic cigarette body, and electrically connected to the atomizing assembly. If the user needs to replace the battery rod assembly 104, it is achieved that the a new battery rod assembly 104 is electrically connect to the atomizing assembly by placing the new battery rod assembly 104 into the cavity 1014, which greatly facilitates the user replacing and maintaining the battery rod assembly.

Optionally, an end of the cavity 1014 that is corresponding to the battery rod assembly 104 is provided with an opening. A cover which is arranged on the opening with detachable connection. Thus, the user only opens the cover, the battery rod assembly 104 can be fetched. Hence, it is brought facilities for the user, and the user experience is improved due to the simple structure.

In the electronic cigarette according to the present application, the atomizing assembly may have other structures. Referring to FIG. 2, the structure of the atomizing assembly 103 will be further described below in detail. An insulating ring 203 is provided between the first electrode 201 and the second electrode 202. The atomizing core 105 further includes a heating wire assembly 204 which is electrically connected to the first electrode 201 and the second electrode 202. the first electrode 201 and the second electrode 202 are electrically connected to the battery rod assembly 104 via wires, so that the battery rod assembly 104 can supply power for the heating wire assembly 204 to atomize the cigarette liquid by the heating wire assembly 204.

The liquid guiding mechanism 106 is connected to the heating wire assembly 204. Specifically, the liquid guiding mechanism 106 may include a sleeve and liquid guiding medium in the sleeve. The liquid guiding medium may be liquid sorbent cotton, liquid guiding fiber or the like, which is not limited herein. A side wall of the sleeve is provided with multiple liquid conveying holes (not shown). In the case that the atomizing assembly 103 and the cigarette liquid container 102 are connected to each other, the liquid guiding mechanism 106 in the atomizing assembly pricks the cigarette liquid container 102 the cigarette liquid in the cigarette liquid container 102 is conveyed to the liquid guiding medium in the sleeve via the liquid conveying holes on the sleeve thereof, and continually is conveyed to the heating wire assembly to be atomized. In a practical application, the oil guiding mechanism may be achieved in other ways, which is not limited herein.

In the present embodiment, through holes communicated with each other are provided at the centers of the first electrode 201, the insulating ring 203 and the second electrode 202 which are connected to each other, and the through holes are in communication with the heating wire assembly 204. An air inlet is provided on a side of the heating wire assembly 204, air outside the electronic cigarette body can reach the smoking end 101 through the air inlet along the through hole, a formed smoke channel is provided at a side of the cigarette liquid container that faces to the atomizing core. After being atomized by the heating wire assembly 204, the cigarette liquid becomes smoke, which flows through the smoke channel to the smoking end 101 along with air flow and is smoked by the user. In this case, the smoke atomized by the atomizing device may directly go into the smoking end, thus greatly reducing the travel distance of the smoke in the electronic cigarette. Furthermore, the smoke directly goes into the smoking end and is sucked away without passing through the cigarette liquid container. Hence, it is avoided to cause condensation, and thus the situations that the smoke channel is blocked by the cigarette liquid and the cigarette liquid is sucked by a user are avoided, and a lot of smoke can be sucked by the user.

In the above individual embodiments, the atomizing assemblies all may be detachably fixed on the frame of the electronic cigarette body. In practical applications, there may be no frame provided on the electronic cigarette body, and the atomizing assembly may be detachably fixed in other ways. For example, the first clamping part and the second clamping part may be arranged at an end of the smoking end. Then, the atomizing assembly may be fixed on the end of the smoking end by cooperating between the first limiting part and the first clamping part and cooperating between the second limiting part and the second clamping part.

In the electronic cigarette according to the present application, the cigarette liquid container is detachably arranged at the end of the atomizing assembly that faces away from the smoking end, and the liquid guiding mechanism of the atomizing assembly pricks the cigarette liquid container. Specifically, referring to FIG. 2, the electronic cigarette body may be provided with a first thread segment 1015. In the present embodiment, the first thread segment 1015 is arranged on the frame 109. An opening end of the cigarette liquid container 102 is provided with a first mating thread for coupling with the first thread segment 1015. The cigarette liquid container 102 is detachably connected to the electronic cigarette body by cooperating between the first mating thread 1015 and the first thread segment.

In a practical application, instead of threaded connection, the cigarette liquid container may be detachably fixed on the electronic cigarette body by other ways, such as snap-fit. For example, the electronic cigarette is provided with a third elastic convex part. The opening end of the cigarette liquid container is provided with a third concave part that is corresponding to the position of the third elastic convex part, and the cigarette liquid container is detachably connected to the elastic cigarette body by cooperating between the third concave part and the third elastic convex part. Alternatively, the electronic cigarette body may be provided with the third concave part. The opening end of the cigarette liquid container is provided with the third elastic convex part that is corresponding to the position of the third concave part, and the cigarette liquid container is detachably connected to the elastic cigarette body by cooperating between the third elastic convex part and the third concave part. Of course, the above description is only used to describe by way of example, and is not limited herein.

In the practical application, in the case that there is no fram provided on the electronic cigarette body, the first thread segment 1015, the third elastic convex part or the third concave part may be arranged on other structures of the electronic cigarette body, as long as being corresponding to the position of the opening of the cigarette liquid container.

In the present embodiment, in order to facilitate the user knowing the amount of the cigarette liquid remained in the cigarette liquid container 102, the cigarette liquid container 102 preferably is a transparent container, the user can know the remaining amount of the cigarette liquid at any time, thus facilitating the user replacing the cigarette liquid container 102 in time.

Optionally, the cigarette liquid container 102 is a glass bottle. Since the material of glass has stable characteristics, it is avoided that the flavor of the cigarette liquid is affected by chemistry reaction.

Optionally, an outer wall of the cigarette liquid container 102 is provided with scales, by which the user can estimate the duration for smoking the remaining amount of the cigarette liquid, bringing facilities for the user.

Optionally, a protection cover (not shown) is provided to avoid the cigarette liquid container 102 from being broken by falling. Optionally, the protection cover is provided with a liquid observation window to facilitate the user observing the liquid.

In the present embodiment, in order to achieve a good sealing of the cigarette liquid container 102 connected to the atomizing assembly 103 so as to prevent the cigarette liquid in the cigarette liquid container 102 from leakage, a sealing ring 1016 with a through hole is preferably arranged at an opening of the cigarette liquid container 102 (referring to FIG. 2), the liquid guiding mechanism 106 pricks the cigarette liquid container 102 through the through hole of the sealing ring, so that the cigarette liquid container 102 may be sealed by the sealing ring 1016 and the liquid guiding mechanism 106.

Optionally, a thin film (not shown) which can be pierced is arranged inside the through hole of the sealing ring 1016, for sealing the cigarette liquid container 102.

In the case that the liquid guiding mechanism 106 in the atomizing assembly 103 pricks the cigarette liquid container 102, the liquid guiding mechanism 106 passes through the thin film (not shown) which can be pierced. By the thin film, the cigarette liquid container 102 pricked by the liquid guiding mechanism 106 still is well sealed, effectively preventing the cigarette liquid from leakage.

The above embodiments are described in a progressive manner. Each of the embodiments is mainly focused on describing its differences from other embodiments, and references may be made among these embodiments with respect to the same or similar portions among these embodiments.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. An electronic cigarette, comprising:
an electronic cigarette body;
wherein the electronic cigarette body is provided with a smoking end, a cigarette liquid container for containing cigarette liquid, an atomizing assembly for atomizing the cigarette liquid, and a battery rod assembly for supplying power for the atomizing assembly, wherein the cigarette liquid container is detachably arranged at an end of the atomizing assembly that faces away from the smoking end;
wherein the atomizing assembly comprises a liquid guiding mechanism, and an atomizing core for atomizing the cigarette liquid, wherein the liquid guiding mechanism pricks the cigarette liquid container for conveying the cigarette liquid in the cigarette liquid container to the atomizing core for atomizing;
wherein the atomizing core is provided with a first limiting part and a second limiting part, a first clamping part and a second clamping part are arranged at two positions on the electronic cigarette body corresponding to the first limiting part and the second limiting part on the atomizing core, respectively; the atomizing assembly is detachably arranged on the electronic cigarette body by cooperation between the first limiting part and the first clamping part and cooperation between the second limiting part and the second clamping part;
wherein the atomizing core comprises a first electrode and a second electrode, the first limiting part is a part of the first electrode, the second limiting part is a part of the second electrode;
wherein one end of the battery rod assembly is provided with a third electrode and a fourth electrode;
wherein the electronic cigarette body is provided with a frame, on which a first connecting device for connecting the first clamping part and the third electrode, and a second connecting device for connecting the second clamping part and the fourth electrode are arranged;
wherein the first limiting part and the second limiting part are a first concave part and a second concave part, respectively; the first clamping part and the second clamping part are a first elastic convex part and a second elastic convex part, respectively;
wherein a first fixing hole is provided at a position on the frame corresponding to an opening of the first concave part, and a second fixing hole is provided at a position on the frame that is corresponding to an opening of the second concave part;
wherein the first elastic convex part comprises a first spring and a first elastic stub which are connected to each other, an end of the first spring that faces away from the first elastic stub is fixed at a bottom of the first fixing hole, the first elastic stub goes beyond the first fixing hole and is movably inserted into the first concave part;
wherein the second elastic convex part comprises a second spring and a second elastic stub which are connected to each other, an end of the second spring that faces away from the second elastic stub is fixed at a bottom of the second fixing hole, the second elastic stub at goes beyond the second fixing hole and is movably inserted into the second concave part.

2. The electronic cigarette according to claim 1, wherein:
the first connecting device further comprises a first elastic needle electrode electrically connected to the first elastic convex part, the second connecting device further comprises a second elastic needle electrode electrically connected to the second elastic convex part;
the frame is provided with a cavity for containing the battery rod assembly, the battery rod assembly is located in the cavity, and the third electrode is electrically contacted to the first elastic needle electrode detachably, the fourth electrode is electrically connected to the second elastic needle electrode detachably.

3. The electronic cigarette according to claim 2, wherein:
an end of the cavity that is corresponding to the battery rod assembly is provided with an opening, a cover is arranged on the opening with detachable connection.

4. The electronic cigarette according to claim 1, wherein:
the atomizing assembly and the cigarette liquid container are arranged in parallel with the battery rod assembly, the end of the atomizing assembly on which the first electrode and the second electrode are arranged is adjacent to the end of the battery rod assembly on which the third electrode and the fourth electrode are arranged; the end of the atomizing assembly which faces away from the first electrode and the second electrode is adjacent to an end of the battery rod assembly which faces away from the third electrode and the fourth electrode.

5. The electronic cigarette according to claim 1, wherein:
the electronic cigarette body is provided with an air inlet and a smoke channel for connecting the smoking end and the air inlet, wherein the smoke channel is arranged on a side of the cigarette liquid container that faces to the atomizing core.

6. The electronic cigarette according to claim 1, wherein:
the electronic cigarette body is provided with a first thread segment;
an opening end of the cigarette liquid container is provided with a first mating thread for coupling with the first thread segment;
the cigarette liquid container is detachably connected to the electronic cigarette body by cooperation between the first mating thread and the first thread segment.

7. The electronic cigarette according to claim 1, wherein the electronic cigarette body is provided with a third elastic convex part;
an opening end of the cigarette liquid container is provided with a third concave part that is corresponding to the third elastic convex part;
the cigarette liquid container is detachably connected to the electronic cigarette body by cooperation between the third concave part and the third elastic convex part.

8. The electronic cigarette according to claim 1, wherein a sealing ring with a through hole is arranged at an opening of the cigarette liquid container, the liquid guiding mechanism pricks the cigarette liquid container through the through hole of the sealing ring, the cigarette liquid container is sealed by the sealing ring and the liquid guiding mechanism.

9. The electronic cigarette according to claim 8, wherein:
a thin film which can be pierced is arranged inside the through hole of the sealing ring, for sealing the cigarette liquid container.

10. An electronic cigarette, comprising:
an electronic cigarette body;
wherein the electronic cigarette body is provided with a smoking end, a cigarette liquid container for containing cigarette liquid, an atomizing assembly for atomizing the cigarette liquid, and a battery rod assembly for supplying power for the atomizing assembly, wherein the cigarette liquid container is detachably arranged at an end of the atomizing assembly that faces away from the smoking end;
wherein the atomizing assembly comprises a liquid guiding mechanism, and an atomizing core for atomizing the cigarette liquid, wherein the liquid guiding mechanism pricks the cigarette liquid container for conveying the cigarette liquid in the cigarette liquid container to the atomizing core for atomizing;
wherein the atomizing core is provided with a first limiting part and a second limiting part, a first clamping part and a second clamping part are arranged at two positions on the electronic cigarette body corresponding to the first limiting part and the second limiting part on the atomizing core, respectively; the atomizing assembly is detachably arranged on the electronic cigarette body by cooperation between the first limiting part and the first clamping part and cooperation between the second limiting part and the second clamping part;
wherein the atomizing core comprises a first electrode and a second electrode, the first limiting part is a part of the first electrode, the second limiting part is a part of the second electrode;
wherein one end of the battery rod assembly is provided with a third electrode and a fourth electrode;
wherein the electronic cigarette body is provided with a frame, on which a first connecting device for connecting the first clamping part and the third electrode, and a second connecting device for connecting the second clamping part and the fourth electrode are arranged;
wherein the first limiting part and the second limiting part are a first concave part and a second concave part, respectively; and the first clamping part and the second clamping part are a first elastic convex part and a second elastic convex part, respectively;
wherein the frame is provided with a first elastic piece and a second elastic piece along two sides of the atomizing core respectively, a portion of the first elastic piece that is corresponding to the first concave part is provided with the first elastic convex part which is movably fixed on the first concave part with a snapping manner;
wherein a part of the second elastic piece that is corresponding to the second concave part is provided with the second elastic convex part which is movably fixed on the second concave part with the snapping manner.

11. The electronic cigarette according to claim 10, wherein:
the first connecting device further comprises a first elastic needle electrode electrically connected to the first elastic convex part, the second connecting device further comprises a second elastic needle electrode electrically connected to the second elastic convex part;
the frame is provided with a cavity for containing the battery rod assembly, the battery rod assembly is located in the cavity, and the third electrode is electrically contacted to the first elastic needle electrode detachably, the fourth electrode is electrically connected to the second elastic needle electrode detachably.

12. The electronic cigarette according to claim 11, wherein:
an end of the cavity that is corresponding to the battery rod assembly is provided with an opening, a cover is arranged on the opening with detachable connection.

13. The electronic cigarette according to claim 10, wherein:
the atomizing assembly and the cigarette liquid container are arranged in parallel with the battery rod assembly, the end of the atomizing assembly on which the first electrode and the second electrode are arranged is adjacent to the end of the battery rod assembly on which the third electrode and the fourth electrode are arranged; the end of the atomizing assembly which faces away from the first electrode and the second electrode is adjacent to an end of the battery rod assembly which faces away from the third electrode and the fourth electrode.

14. The electronic cigarette according to claim 10, wherein:
the electronic cigarette body is provided with an air inlet and a smoke channel for connecting the smoking end and the air inlet, wherein the smoke channel is arranged on a side of the cigarette liquid container that faces to the atomizing core.

15. The electronic cigarette according to claim 10, wherein:
the electronic cigarette body is provided with a first thread segment;
an opening end of the cigarette liquid container is provided with a first mating thread for coupling with the first thread segment;
the cigarette liquid container is detachably connected to the electronic cigarette body by cooperation between the first mating thread and the first thread segment.

16. The electronic cigarette according to claim 10, wherein the electronic cigarette body is provided with a third elastic convex part;
an opening end of the cigarette liquid container is provided with a third concave part that is corresponding to the third elastic convex part;
the cigarette liquid container is detachably connected to the electronic cigarette body by cooperation between the third concave part and the third elastic convex part.

17. The electronic cigarette according to claim 10, wherein a sealing ring with a through hole is arranged at an opening of the cigarette liquid container, the liquid guiding mechanism pricks the cigarette liquid container through the through hole of the sealing ring, the cigarette liquid container is sealed by the sealing ring and the liquid guiding mechanism.

18. The electronic cigarette according to claim 17, wherein:
a thin film which can be pierced is arranged inside the through hole of the sealing ring, for sealing the cigarette liquid container.

* * * * *